April 19, 1949.
C. T. PARKER
2,467,773
SORTING DEVICE FOR SEPARATING ARTICLES
OF DIFFERENT CONDUCTIVITIES
Filed May 11, 1945
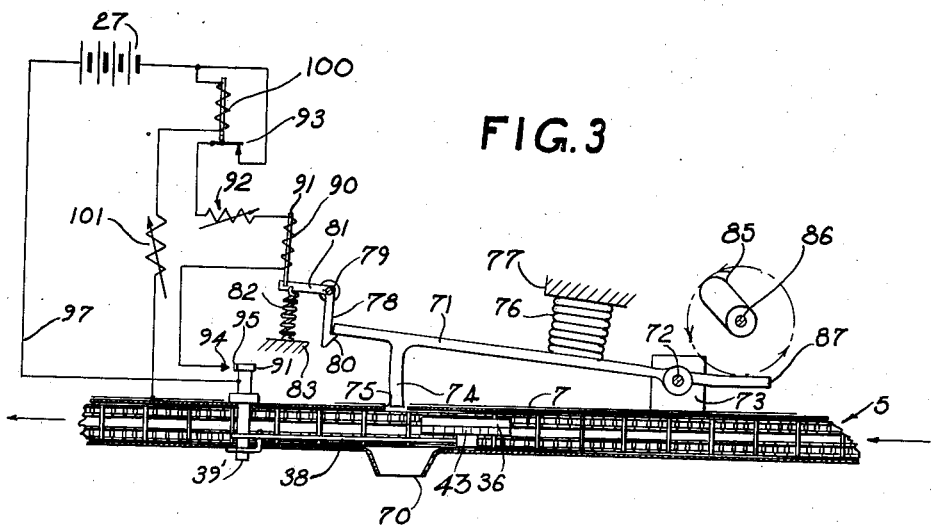
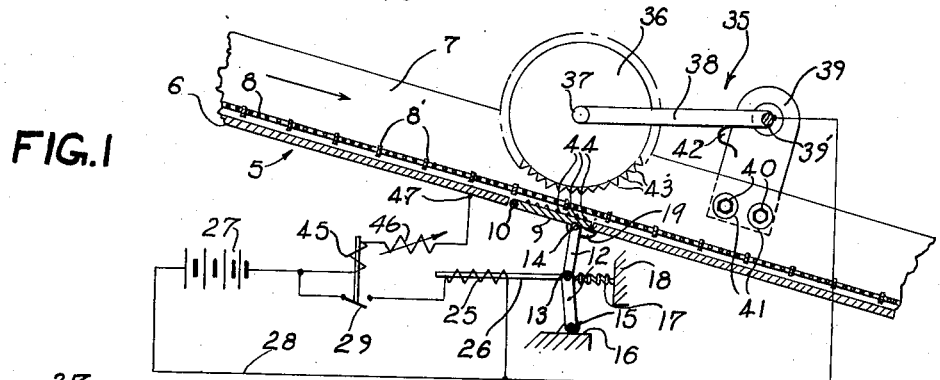
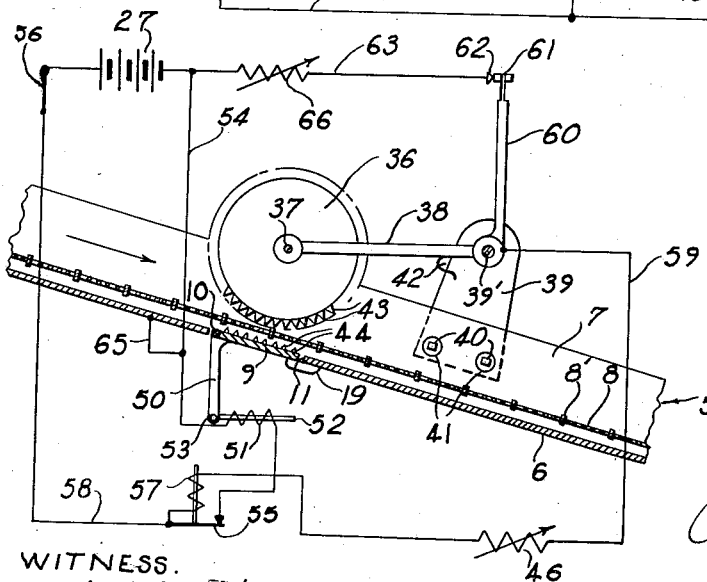
WITNESS.
Clifford S. Zude
INVENTOR.
Charles T. Parker Patented Apr. 19, 1949

2,467,773

UNITED STATES PATENT OFFICE 2,467,773

SORTING DEVICE FOR SEPARATING ARTICLES OF DIFFERENT CONDUCTIVITIES

Charles T. Parker, Moline, Ill., assignor to Deere & Company, Moline, Ill., a corporation of Illinois Application May 11, 1945, Serial No. 593,187

11 Claims. (Cl. 209—81)

The present invention relates generally to sorting devices and has for its principal object the provision of a sorting device for automatically separating stones from crops, with particular reference to root crops which are dug out of the ground by means of a scoop or plow, together with a considerable quantity of dirt and stones. My invention is particularly well adapted to harvesting potatoes, although I do not intend its use to be limited to this particular crop, for the principles of my invention may be applied to other root crops, such as beets.

It is well known to those skilled in the art that potatoes can be easily separated from any soil tending to cling thereto, but heretofore no mechanism has been devised which will automatically and satisfactorily separate potatoes from stones of a similar size and shape. Consequently, commercial potato harvesters available on the market today merely agitate the potatoes to separate the soil therefrom and then discharge the potatoes and stones in a windrow behind the harvester to be gathered later by hand.

Therefore, it is a more specific object of my invention to provide a testing device which is sensitive to certain differences between potatoes and stones, and separating mechanism controlled by the testing device for mechanically performing the separation.

In the accomplishment of these objects, I have recognized two important differences between potatoes and stones of a similar size, first, that the surfaces of potatoes can be penetrated by a sharp instrument, and second, that the electrical conductivity of a potato is greater than that of a stone. Hence, by slightly piercing or penetrating the surface of each potato with a suitable testing instrument, an electrical contact can be made for the purpose of passing a current through the potato. However, when the same instrument is applied to a stone with an equal pressure, it obviously will not penetrate the surface and furthermore, since the electrical conductivity of the stone is very low a considerably smaller current will flow through the testing device and the stone for a given voltage applied thereto. According to the present invention, this difference in electrical resistance is used to control a separating mechanism such as a trap door in the bottom of a conveyor, for separating the stones from the potatoes or vice versa.

These and other objects and advantages of my invention will be apparent to those skilled in the art after a consideration of the following description, in which reference is had to the drawings appended hereto, in which Figure 1 is a sectional elevational view taken along the center line of a conveyor equipped with a sorting device embodying the principles of my invention, showing in diagrammatical form the electrical circuits involved;

Figure 2 is a similar view showing a modified form of my invention; and

Figure 3 is a top plan view of a conveyor showing a third embodiment of my invention.

Referring now to the drawings, and more particularly to Figure 1, the conveyor comprises a trough 5 having an inclined bottom 6 and a pair of laterally spaced side walls 7, between which is disposed an endless chain type conveyor 8 having transversely disposed slats 8I movable along the trough 5 in a downward direction as indicated by the arrow. The trap door is pivotally mounted on a transverse pivot 10 in the bottom of the trough 5 and is swingable vertically about the transverse axis 10 from a normal position in alignment with the bottom 6 of the trough downwardly away from an opening 11 in the bottom wall 6. The trap door 9 is held in closed position by means of a pair of toggle links 12 having their adjacent ends pivotally connected together by a pivot pin 13. The outer end of one of the links is pivoted at 14 to the bottom of the trap door 9 and the other link 12 is pivotally connected at 15 to any suitable stationary support 16, which may be a part of the supporting frame of the conveyor. The tension spring 17 is connected to the pivot 13 interconnecting the links 12 and is anchored to any suitable stationary support 18, and is stressed in tension to urge the toggle links 12 in alignment, supporting the trap door in its closed position as determined by a stop 19 on the door 9 extending under the edge of the trough bottom 6.

The trap door is opened by means of a solenoid coil 25 having an armature 26 connected to the interconnecting pivot 13 on the side opposite the spring 17. When the solenoid coil 25 is energized, the armature 26 pulls the pivot 13 toward the left against the tension of the spring 17, thereby opening the trap door 9 downwardly away from the floor opening 11.

The solenoid coil 25 is energized from any suitable source of electric energy at substantially constant voltage, such as a battery 27, one side of the latter being connected by a conductor 28 to one side of the solenoid coil 15, while the other side of the battery is connected through a relay 29 with the other side of the coil 25. The contacts of the relay 29 are normally open, permitting the spring 17, acting through the toggle links 12, to hold the trap door 9 in closed position.

The potatoes are distinguished from the stones by means of a testing device indicated in its entirety by reference numeral 35 and comprising a contact wheel 36 journaled on an axle 37, which is fixed to a supporting arm 38. The arm 38 is journaled in a support 39 fixed to the outer side of the conveyor trough by means of bolts 40. The support 39 is insulated from the conveyor trough 5 and the bolts 40 are provided with insulating washers 41, thereby completely insulating the support 39 from the conveyor in a manner well known to those skilled in the art. The contact wheel 36 is supported over the bottom 6 of the trough 5 and is rotatable about a transverse axis and also is swingable vertically relative to the trough 5 about a transverse axis. A stop lug 42 on the support 39 engages the supporting arm 38 to prevent the wheel 36 from touching the bottom 6 of the trough.

The contact wheel 36 is provided with a series of circumferentially spaced contact teeth which are adapted to penetrate the surfaces of the potatoes to establish a good electrical contact between the wheel 36 and the potatoes, but it is preferable that the teeth 43 be made as short as possible in order that no appreciable damage would be done to the potatoes. Possibly, if the potatoes are cleaned, it would not be necessary to provide teeth on the contact wheel, but in order to insure a good contact under all conditions the contact teeth are included. It is believed that a series of rasps such as are found on files, will serve the purpose, or if desired, teeth may be provided in the nature of sawteeth.

Another series of teeth 44 is provided on the surface of the trap door 9, and the contact wheel 36 is positioned substantially directly above the trap door 9 but spaced above the latter a distance slightly less than the diameter of the smaller potatoes to be handled.

One side of the coil 45 of the relay 29 is connected to the battery 27 while the other side is connected in series with a variable resistor 46 to a connection 47 with the conveyor trough bottom 6. A wire 48 is connected to the wire 28 on the other side of the battery and to the contact wheel 36 through the supporting arms 38.

During operation, the conveyor chain 8 moves toward the right as viewed in Figure 1, the slats 9 engaging the stones and potatoes and moving them between the contact wheel 36 on the trap door 9. The wheel 36 rolls over the stones and potatoes, making an electrical contact with each stone and each potato. However, since the teeth do not penetrate the surfaces of the stones, there is very little area of contact between the points of the teeth 43 and the stones. Furthermore, the electrical conductivity of stone is very low and therefore substantially no current flows through a stone between the trap door 9 and the contact wheel 36 unless the stone is wet, in which case a very small current will flow between the teeth 43, 44 along the wet surface of the stone. In any case however the current through the control circuit, which includes the solenoid coil 45, the variable resistor 46 and the contact wheel 36 is insufficient to cause the solenoid coil 45 to close the relay 29, therefore the trap door 9 remains closed and the stones are conveyed along the conveyor trough 5.

When a potato passes under the contact wheel 36, however, the teeth 43, 44 slightly penetrate the surface of the potato, establishing a good electrical contact, and since the conductivity of a potato is appreciably greater than that of a stone, a current will flow through the solenoid coil 45, the variable resistor 46, the bottom 6 and the trap door 9 in the conveyor, the contact wheel 36, its supporting arm 38, and returning to the battery through the wires 48 and 28. This current, flowing through the solenoid coil 45 is sufficient to close the relay 29, thereby energizing the solenoid coil 25, collapsing the toggle links 12 and thus opening the trap door 9, whereupon the potato drops through the opening 11 to any suitable collector (not shown) beneath the conveyor trough 5.

The coil 45 is obviously designed to close the relay responsive to the flow of the small current which will be transmitted through the potato. Inasmuch as the resistance of the potatoes will vary according to moisture content and other conditions, the variable resistor 46 is provided for the purpose of adjusting the current flow through the coil 45 to the proper value, and also to insure that the current which flows between the contact teeth 43, 44 over the surface of the wet stone is limited to a value beneath the minimum required for closing the relay 29.

As the trap door 9 swings downwardly, the potato drops away from contact with the wheel 36, the downward movement of which is limited by the stop 42, breaking the circuit through the coil 45 and deenergizing the solenoid coil 25. The weight of the potato however is sufficient to overcome the tension of the light spring 17 until the potato falls away from the trap door 9, after which the spring 17 quickly restores the door to closed position. With the toggle links 12 in substantially dead-center alignment, the weight of the stones is ineffective to open the door 9 without assistance from the solenoid coil 25.

In the embodiment of Figure 2, the stones are dropped through the trap door opening 11 while the potatoes are conducted downwardly along the conveyor trough 5. In this embodiment, the trap door 9 is provided with a lever arm 50 rigidly fixed to the bottom of the door 9 and extending downwardly therefrom. The solenoid coil 51 is provided with an armature 52 which is pivotally connected at 53 and the trap door 9 is held in closed position as long as the solenoid coil 51 is energized, but when the coil is deenergized the weight of the door 9 plus the weight of a stone carried thereon is sufficient to quickly cause the door to drop away from the opening 11, allowing the stone to drop through the latter. One side of the solenoid coil 51 is connected by a wire 54 to one side of the battery 27 and the other side of the coil 51 is connected through a realy 55 with the other side of the battery 27. Since this is a normally closed connection, a disconnect switch 56 is provided between the relay 55 and the battery 27. The relay 55 is normally held closed by a relay coil 57 one end of which is connected to the wire 58 connecting the relay 55 with the switch 56. The other end of the relay 57 is connected in series with a variable resistor 46 to the wheel supporting arm 38 by a wire 59.

In this embodiment the wheel supporting arm 38 is provided with a contact arm 60 which carries the contact 61 which is normally in contact with a stationary contact 62, the latter being connected by a wire 63 to the battery 27. Thus, there is a normally closed circuit through the relay coil 57, the resistor 46, arm 60, and contacts 61, 62, which hold the relay 55 in closed position and thereby constantly energizing the solenoid coil 51 to hold the trap door 9 closed.

When either a stone or a potato moves under the contact wheel 36, the latter is raised about its pivotal connection 39' with the support 39 in a clockwise direction. This movement swings the arm 60 and contact 61 away from the stationary contact 62, and in the case of a stone, this breaks the circuit through the relay coil 57 and allows the relay 55 to open and deenergize the solenoid coil 51. This allows the trap door 9 to drop open, discharging the stone beneath the conveyor 6. As the stone drops away from the wheel 36, the latter returns by gravity into the position limited by the stop lug 42, thereby reclosing the contacts 61, 62 and establishing the circuit through the relay coil 57. The relay 55 then closes and energizes the solenoid 51 which closes the trap door 9. When a potato passes under the contact wheel 36, the contacts 61, 62 are separated as when a stone is engaged by the wheel, but in this case a parallel circuit is established through the arm 38, the wheel 36, the teeth 43, 44, and a connection 65 between the bottom 6 of the conveyor and the wire 54 which returns to the battery 27. Hence, this parallel circuit bypasses the contacts 61, 62 and thereby holds the relay 55 closed when a potato passes under the wheel 36, with the result that the potato is not discharged through the opening 11 but is carried on along the conveyor trough 5. It will be noted that a second variable resistor 66 is connected in series with the contacts 61, 62 in order to adjust the resistance of the circuit through the contacts 61, 62 to a value substantially equal to the resistance of the potatoes between the teeth 43, 44.

It is possible that under some crop conditions the current flowing through the crops between the contact teeth 43, 44 may be insufficient to operate the relay 29 or 55 which energizes the solenoid coil 25 or 51, respectively, in which case it is believed that anyone skilled in the art can interpose suitable means for amplifying the current through the crops to operate the relay.

In the embodiment shown in Figure 3, a different type of separating means has been provided in place of the trap door 9 in Figures 1 and 2. In Figure 3, the stones are discharged through a laterally extending chute 70 by means of an impeller 71 in a form of an arm which is pivotally mounted on a vertical pivot pin 72, the latter being firmly supported on a stationary frame member 73. The impeller 71 is provided with a stone engaging member 74 which projects through an opening 75 in the side wall 7 of the conveyor trough 5 on the side opposite the chute 70. Thus, when the arm 71 is swung about its pivot 72 in a counterclockwise direction, the engaging member 74 projects transversely across the trough 5 and drives the stone laterally over the chute 70. The impeller arm 71 is actuated by means of a strong compression spring 76 which bears against the arm 71 and reacts against a suitable stationary support 77.

Normally, the arm is retained in a position in which the stone engaging part 74 is retracted from the conveyor trough 5. This is accomplished by means of a latch 78 pivotally mounted on a pivot pin 79 and having a latch dog 80 which engages the outer end of the arm 71. The latch arm 78 is provided with a crank arm 81, to which is connected a tension spring 82 anchored to a stationary support 83. The spring 82 is biased to hold the latch dog 80 in latched position, but is yieldable to permit the disengagement of the latch dog 80, thereby permitting the compression spring 76 to forcefully project the stone engaging member 74 across the bottom 6 of the conveyor to drive the stone over the chute 70. The member 74 is retracted by swinging the arm 71 in a clockwise direction about its pivot support 72 to relatch the latch dog 80, this being accomplished by means of a resetting cam 85 fixed to a continuously rotating shaft 86 which rotates in a counter clockwise direction as indicated by the arrows. The arm 71 is provided with an extension 87 beyond the pivot 72, which is moved into the path of movement of the cam 85 when the impeller 71 is actuated to engage a stone. The cam 85 then engages the extension thereby swinging the arm in a clockwise direction about the pivot 72 to compress the spring 76 and reset the latch 80. The shaft 86 is continuously rotated by any suitable driving means, the details of which are not an important part of the present invention.

The latch dog 80 is tripped by means of a solenoid coil 90, having an armature 91 connected to the crank arm 81. One end of the solenoid coil 90 is connected through a variable resistor 92 and a relay 93 to one side of the battery 27. The other side of the solenoid coil 90 is connected to a stationary contact 94 which is engageable with a movable contact 95 mounted on an arm 96 which extends upwardly from a rockshaft 39' on which the contact wheel supporting arm 38 is mounted. The rockshaft 39' is connected to the battery by a wire 97.

Normally, the contacts 94, 95 are separated, but when either a potato or a stone travels under the wheel 36, raising the latter, the rockshaft 39' is rotated about its transverse axis to close the contacts 94, 95 thereby closing the circuit through the solenoid coil 90 and tripping the latch dog 80. This tripping operation is prevented, however, when a potato contacts the wheel 36, by opening the relay 93 at the same time that the contacts 94, 95 are closed. The relay 93 is a normally closed relay having an operating coil 100, one side of which is connected to one side of the battery and the other side of which is connected through a variable resistor 101 to the conveyor trough 5. When the contact wheel 36 engages a potato, a circuit is completed through the relay 100, the variable resistor 101, the conveyor trough 5, the potato, the wheel 36, the supporting arm 38, the rockshaft 39', and the wire 97, which energizes the relay coil 100 to open the relay 93 and thereby preventing the solenoid 90 from being energized.

As indicated by the arrow, the conveyor 8 moves toward the left in this embodiment, carrying the stones and potatoes under the wheel 36, which makes contact with each stone and potato successively. The latch dog 80 remains latched under the arm 71 until the solenoid coil 90 is energized to trip the latch, which happens when a stone raises the wheel 36, closing the contacts 94, 95, but having an electrical resistance high enough to prevent the relay coil 100 from opening the relay contact 93. It will be noted that the contact wheel 36 is positioned slightly ahead of the stone engaging member 74, for the stone will be moved slightly beyond the wheel 36 by the time the arm 71 swings the member 74 across the conveyor trough 5 to engage the stone.

Other embodiments of my invention will now be apparent to those skilled in the art and therefore I do not intend my invention to be limited to the particular details shown and described

I claim:

1. A sorting device for separating articles of different conductivities, comprising a passageway along which the articles are conducted, a contact wheel mounted in said passageway by means providing for movement relative thereto, said wheel being shifted by engagement with each of said articles as the latter pass thereby, separating mechanism for acting selectively upon said articles to separate one from another, an electric circuit for governing the actuation of said separating mechanism, said circuit including switching means actuated by shifting movement of said contact wheel for controlling current flow in said circuit, said wheel having means for penetrating the surfaces of certain of the articles for establishing a good electrical contact, said penetrating means being incapable of penetrating the surfaces of others of said articles, whereby the electrical resistance in said circuit is increased, and means responsive to a predetermined amount of current through said electrical contact for influencing the control of said separating mechanism.

2. A sorting device for separating root crops from stones comprising a passageway through which the crops and stones are conducted, a contact member supported in said passageway by means providing for movement relative thereto, said member being shifted by engagement with each stone or crop root as the latter pass thereby, separating mechanism for acting upon said stones and root crops to separate one from another, an electric circuit for governing the actuation of said separating mechanism, said circuit including switching means actuated by shifting movement of said contact member to close said circuit to effect an actuation of said separating mechanism, said contact member having means for penetrating the surfaces of the root crops for establishing a good electrical contact therewith, said penetrating means being incapable of penetrating the surface of the stones, whereby the electrical resistance in said circuit is increased, and means responsive to flow of current through said electrical contact for breaking said circuit.

3. A sorting device for separating root crops from stones comprising a passageway through which the crops and stones are conducted, a contact member supported in said passageway by means providing for movement relative thereto, said member being shifted by engagement with each stone or crop root as the latter pass thereby, separating mechanism for acting upon said stones and root crops to separate one from another, an electric circuit for governing the actuation of said separating mechanism, said circuit including normally closed switching means for closing said circuit to hold said separating mechanism in one position, said switching means being opened by shifting movement of said contact member to release said mechanism, said contact member having means for penetrating the surfaces of the root crops for establishing a good electrical contact therewith, said penetrating means being incapable of penetrating the surfaces of the stones, whereby the electrical resistance in said circuit is increased, and means responsive to flow of current through said electrical contact for closing said circuit independent of said switching means.

4. A sorting device for separating root crops from stones comprising a passageway through which the crops and stones are conducted, a contact member supported in said passageway providing for movement relative thereto, said member being shifted by engagement with each stone or crop root as the latter pass thereby, a trap door in said passageway through which stones can pass, electrically energized means for normally holding said door in closed position including an electric circuit comprising normally closed switching means adapted to be opened by shifting movement of said contact member to release the trap door to pass a stone, said contact member having means establishing electrical contact with each stone and crop root, successively, said electrical contact strongly established with root crops by penetrating means on said contact member, said penetrating means being incapable of penetrating surfaces of stones to obtain a good electrical contact, and said contact member electrically connected with said door holding means to energize the latter through contact with a crop root, thereby holding said trap door closed to prevent crops from passing therethrough.

5. A sorting device for separating root crops from stones comprising a passageway through which the crops and stones are conducted, a contact wheel rotatably supported in said passageway providing for movement relative thereto, said wheel being shifted by engagement with each stone and crop root as the latter pass thereby, a trap door in said passageway through which stones can pass, means including a solenoid coil for normally holding said door in closed position, a source of electrical energy, and a relay connecting said source with said coil, normally closed switching means associated with said contact wheel for controlling said relay to energize said solenoid coil, said switching means being opened by said movement of the wheel when the latter engages stones and crops, said contact wheel having means establishing a circuit through the crops and stones in parallel with said switching means to control said relay independent of said switching means.

6. A sorting device for separating articles of different conductivities, comprising a passageway along which the articles are conducted, a contact member supported in said passageway by means providing for movement relative thereto, said member being shifted by engagement with each of said articles as the latter pass thereby, separating mechanism for acting selectively upon said articles to separate one from another, electric circuit means for operating said separating mechanism, said circuit means including switching means actuated by shifting movement of said contact member for interrupting a flow of current to allow said separating means to move from one position to another, said contact member having means contacting each of said articles, successively, and means responsive to flow of current through said contacting means for restoring said flow of current to prevent said separating means from moving from said one position to the other.

7. A sorting device for separating articles of different conductivities, comprising a passageway along which the articles are conducted, a contact member supported in said passageway by means providing for movement relative thereto, said member being shifted by engagement with each of said articles as the latter pass thereby, separating mechanism for acting selectively upon said articles to separate one from another, electric circuit means for operating said separating mechanism, said circuit means actuated by shifting movement of said contact member for establishing a flow of current to initiate a movement of said separating means, said contact member having means for electrically contacting each of said articles, successively, said contact member having means for penetrating the surfaces of the articles of greater conductivity, said penetrating means being incapable of penetrating the surfaces of the articles of the lesser conductivity, whereby the electrical resistance in said circuit is greatly increased, and means responsive to flow of current through said contacting means for interrupting said flow of current to prevent said initiation of movement of the separating means.

8. A sorting device for separating root crops from stones comprising a passageway through which the crops and stones are conducted, a contact member supported in said passageway by means providing for movement relative thereto, said member being shifted by engagement with each stone or crop root as the latter pass thereby, separating mechanism for acting upon said stones and root crops to separate one from another, an electric circuit for governing the actuation of said separating mechanism, said circuit including switching means closed by said movement of said contact member to initiate a movement of said separating means, said contact member having means establishing electrical contact with each stone and crop root, successively, said electrical contact strongly established with root crops by penetrating means on said contact member, said penetrating means being incapable of penetrating surfaces of stones to obtain a good electrical contact therewith, and a relay having an operating coil connected with said contact means to receive energy therethrough in appreciably greater amount when contact is made with crops than when contact is made with stones, said relay being actuated by said greater amount of energy only, and including normally closed switching means in series with said first mentioned switching means for preventing the initiating of movement of said separating means when contact is made with crops but permitting said movement when contact is made with stones.

9. A sorting device for separating root crops from stones comprising a passageway through which the crops and stones are conducted, a contact member supported in said passageway by means providing for movement relative thereto, said member being shifted by engagement with each stone and crop root as the latter pass thereby, stone impelling means engageable with stones in said passageway for separating the stones from the crops, a tripping device for initiating movement of said impelling means, control means responsive to shifting movement of said contact member for actuating said tripping device, said contact member having means establishing electrical contact with each stone and crop root, successively, for transmitting current therethrough, said electrical contact strongly established with root crops by penetrating means on said contact member, said penetrating means being incapable of penetrating surfaces of stones to obtain a good contact therewith, and means responsive to a predetermined minimum flow of current through said contact for preventing the tripping of said device.

10. The combination set forth in claim 9 including the further provision that said impelling means comprises a pivoted arm biased for movement into engagement with stones in said passageway, and said tripping device comprises a latch engageable with said arm for holding the latter out of said passageway against the pressure of said biasing means, and power driven means for returning said arm to latched position after said device has been tripped.

11. The combination set forth in claim 9, including the further provision of an electric circuit including said contact establishing means, a source of electrical energy, and means for adjusting the resistance of said circuit to produce a current greater than said minimum value when said contact member contacts crops in said passageway and a current less than said minimum value when said member contacts stones in said passageway.

CHARLES T. PARKER.

REFERENCES CITED

The following references are of record in the file of this patent:

UNITED STATES PATENTS

| Number | Name | Date |
| --- | --- | --- |
| 1,153,381 | Gudmundsen | Sept. 14, 1915 |
| 1,431,814 | Kanengieter | Oct. 10, 1922 |
| 1,967,296 | Dixon | July 24, 1934 |
| 1,987,244 | Moore | Jan. 8, 1935 |
| 2,086,060 | Appleyard | July 6, 1937 |
| 2,101,381 | Appleyard | Dec. 7, 1937 |
| 2,198,285 | Krenzer | Apr. 23, 1940 |

FOREIGN PATENTS

| Number | Country | Date |
| --- | --- | --- |
| 494,092 | Germany | May 7, 1930 |